United States Patent [19]

McGuire

[11] 4,135,856
[45] Jan. 23, 1979

[54] ROTOR BLADE RETENTION SYSTEM

[75] Inventor: Dennis P. McGuire, Erie, Pa.

[73] Assignee: Lord Corporation, Erie, Pa.

[21] Appl. No.: 765,151

[22] Filed: Feb. 3, 1977

[51] Int. Cl.$^2$ .................................... B64C 27/38
[52] U.S. Cl. ............................ 416/134 A; 416/141
[58] Field of Search .......... 416/134 A, 138 A, 140 A, 416/141, 103, 106, 107

[56] References Cited

U.S. PATENT DOCUMENTS

| | | | |
|---|---|---|---|
| 3,026,942 | 3/1962 | Cresap | 416/114 |
| 3,504,989 | 4/1970 | Kisovec | 416/141 X |
| 3,556,673 | 1/1971 | Kilian | 416/141 |
| 3,652,185 | 3/1972 | Cresap et al. | 416/134 A |
| 3,700,352 | 10/1972 | Gorndt | 416/141 |
| 3,790,302 | 2/1974 | Pascher | 416/134 A |
| 3,807,896 | 4/1974 | Johnson | 416/134 A |
| 3,942,910 | 3/1976 | Snyder et al. | 416/141 |
| 3,967,918 | 7/1976 | Mouille et al. | 416/138 A X |
| 4,012,169 | 3/1977 | Mouille et al. | 416/141 X |

Primary Examiner—Everette A. Powell, Jr.
Attorney, Agent, or Firm—Maurice R. Salada

[57] ABSTRACT

A rotor blade retention system connects an elongated rotor blade to a rotor hub that is rotatable about its central axis. The connected rotor blade normally extends generally radially from the hub and is rotatable with the hub. The retention system includes a pair of bearings that are interconnected in parallel load transmitting relationship. Both bearings are connected in serial load transmitting relationship with a flap hinge. One bearing is relatively stiff along the longitudinal axis of the rotor blade and is less stiff in directions transverse to the longitudinal blade axis. The other bearing is most stiff in directions transverse to the rotor blade axis and is less stiff along the axis. Both bearings define effective elastic centers which are located along the longitudinal blade axis, but the two elastic centers are spaced from each other. The two bearings accommodate lead-lag motions of the rotor blade. Because of the relative stiffnesses of the bearings in directions transverse to the longitudinal axis of the rotor blade, the axis about which lead-lag motion occurs is displaced from the effective elastic center of the bearing that has its greatest stiffness along the longitudinal blade axis. The displacement of the lead-lag axis causes the bearing, and the retention system, to appear relatively stiff in response to lead-lag motions. The stiffness of the blade retention system in response to flapping motions of the rotor blade is not affected, however, because the serially connected flap hinge accommodates most of the flapping motion in preference to the bearings. Since the retention system is relatively stiff in response to lead-lag motions, less damping is required at the natural frequencies of lead-lag motion. The required damping may be provided entirely by material incorporated into the bearings and without the use of an auxiliary lead-lag damper.

11 Claims, 2 Drawing Figures

ROTOR BLADE RETENTION SYSTEM

BACKGROUND OF THE INVENTION

In rotary wing aircraft, such as helicopters, two or more elongated rotor blades are mounted on a central rotor hub. The blades normally extend generally radially from the hub and are rotatable with the hub about its central axis. When the rotor hub is being driven, centrifugal, aerodynamic, and other forces are exerted on the rotor blades and tend to cause the blades to pivot relative to the hub. The pivoting generally occurs in a plane in which the blades normally lie and which is typically oriented normal to the central axis or axis of rotation of the rotor hub. In-plane pivoting motion of a rotor blade, which is also termed lead-lag or drag motion, represents an effort by the blade to respond to the forces acting upon it and to seek a position of equilibrium. The equilibrium position of each rotor blade constantly changes, however. The primary cause of changes in the in-plane equilibrium position of a rotor blade is Coriolis moments produced by vertical flapping motions of the blade. Other causes include changes in the aerodynamic forces on the blade due to crossflows of air over the blade. The lead-lag motion that results from such changes in the blade's equilibrium position appears as a swinging motion of small amplitude with respect to the rotor hub.

One method of mounting the blades of a helicopter rotor on the rotor hub is to provide a blade retention system between each rotor blade and the hub which is relatively stiff or inflexible with respect to in-plane or lead-lag motions of the rotor blade. Typically, a stiff in-plane blade retention system consists of a relatively inflexible or rigid interconnection between a rotor blade and the rotor hub. Thus, for example, the rotor blade may be bolted directly into a corresponding socket formed in the rotor hub. The result of utilizing such a stiff in-plane blade retention system is that the rotor blade has relatively little freedom of movement in the lead-lag direction and the natural frequency of oscillation of the rotor blade in the lead-lag mode is greater than the nominal rotational speed of the rotor hub and blades. Stated another way, a stiff in-plane blade retention system is, by definition, a system in which the rotor blade completes more than one full cycle of lead-lag motion per revolution of the rotor hub at the natural frequency of lead-lag motion. The advantage of such a relatively high natural frequency for the lead-lag motion of a rotor blade is that destructive ground resonances, which are discussed below, can be avoided. The disadvantage of the high natural frequency of a stiff in-plane blade retention system is that very large loads and bending moments are imposed directly on and must be borne by the rotor blade and hub. The rotor is forced to accommodate oscillatory lead-lag moments which are still imposed on the rotor and which cause significant fatiguing of the materials of which the rotor blades and hub are constructed. The problem of fatigue failure in rotors having relatively stiff in-plane blade retention systems is presently such that stiff in-plane retention systems are not typically used. Stiff in-plane systems probably will not be used commercially unless and until some significant progress is made in developing new materials for such systems.

The other method of mounting the blades of a helicopter rotor on the rotor hub is to provide an articulated blade retention system between each rotor blade and the hub. Although all such articulated blade retention systems may be described as relatively soft in-plane, with reference to lead-lag motions of the rotor blades, articulated blade retention systems are typically classified as fully articulated, on the one hand, and soft in-plane, on the other hand. Fully articulated blade retention systems produce a natural oscillation frequency of a rotor blade in the lead-lag mode of about 0.25 to 0.35 cycles per revolution of the rotor hub. In comparison, soft in-plane blade retention systems produce a natural oscallation frequency of a rotor blade in the lead-lag mode of about 0.65 cycles per revolution of the rotor hub. Because both types of articulated blade retention systems afford the rotor blades additional freedom of movement in their plane of rotation, any rotor which incorporates such a system has a potential condition of instability at at least one critical speed of rotation while the helicopter is resting on the ground. The instability, which is termed ground resonance, is produced by a coupling between the motion of the supporting structure for the rotor hub, including the landing gear and tires, and the pendular motions of the blades as they pivot in the lead-lag direction. Due to the elastic flexibility of the supporting structure and the pendular frequency of the blades, the coupling action may produce, at the critical speed(s), violent and uncontrollable rotor blade oscillations that may reach destructive proportions if uncontrolled.

Articulated blade retention systems are the primary blade retention systems used in helicopters at present because the hinge mechanisms that provide the articulation also tend to avoid the structural stresses and materials fatigue failures that are encountered in stiff in-plane rotor blade retention systems. The undesirable ground resonances that are encountered when using articulated blade retention systems are usually accommodated and effectively mitigated by utilizing auxiliary damping devices. The damping devices are effective at the critical frequencies of ground resonance (i.e., the natural frequencies of lead-lag motion) to damp and reduce the resonant motions of the rotor blades. Although the use of auxiliary lead-lag dampers introduces additional weight, cost and complexity into a helicopter rotor, the disadvantages have been accepted for the present because of the insurmountable materials problems presented by relatively stiff in-plane rotor blade retention systems.

Early proposals for articulated rotor blade retention systems incorporated antifriction bearings, such as roller bearings or ball bearings, to provide the necessary articulation. More recently, articulated retention systems have been developed which incorporate one or more laminated elastomeric bearings, rather than antifriction bearings. Such laminated bearings comprise a plurality of alternating and bonded together layers of elastomeric material and substantially inextensible material. The bearings do not require lubrication, have only limited maintenance requirements, and affords a reduction in weight as compared to antifriction bearings. The advantages of laminated elastomeric bearings are such that the bearings have found widespread use and acceptance throughout the helicopter industry and have been incorporated in a number of different helicopter rotor blade retention systems.

Blade retention systems that incorporate laminated elastomeric bearings typically include auxiliary lead-lag dampers. Examples of such systems are described and illustrated in Mosinskis U.S. Pat. Nos. 3,501,250, Rybicki 3,759,631, and Rybicki et al 3,764,230. Since elastomers possess some inherent internal damping capabilities, some auxiliary lead-lag dampers, such as the one shown in Potter U.S. Pat. No. 3,842,945, utilize elastomer to provide the necessary damping. It has also been suggested, however, that the laminated elastomeric bearings of articulated blade retention systems might themselves provide all of the lead-lag damping that is required in a helicopter rotor. Bearings that function as dampers would eliminate the extra weight, cost, and complexity of auxiliary lead-lag dampers. Thus, for example, Gorndt et al U.S. Pat. No. 3,111,172 suggests, at column 2, lines 38–41, that elastomeric bearings may eliminate the need for an auxiliary damper because the elastomeric bodies in the bearings can be selected to have an internal friction sufficient to provide the necessary damping.

Although the Gorndt et al patent proposes to eliminate an auxiliary lead-lag damper, the blade retention system that is described and illustrated in the patent is not capable of achieving such a desirable result in practice. The difficulty with the Gorndt et al blade retention system is that a single, main laminated elastomeric bearing is utilized to accommodate not only lead-lag motions of an attached helicopter rotor blade, but also flapping motions of the blade. Flapping motions are oscillatory movements of the blade which are similar to lead-lag motions, but which occur in planes generally perpendicular to the plane of rotation of the blade and to the plane in which lead-lag motions occur. In a typical helicopter rotor, the normal flap motion of each rotor blade is seven to eight times the lead-lag motion (e.g., + or − 3.5° in flap versus + or − 0.4° in lead-lag). In order to accommodate the flapping motions of a rotor blade, the main laminated bearing of the Gorndt et al blade retention system must incorporate a relatively large total thickness of elastomer. The large thickness of elastomer necessarily reduces the spring rate of the bearing in the lead-lag direction and the natural frequency of oscillation of the rotor blade about the lead-lag axis. As the lead-lag spring rate decreses, the degree of damping (i.e., the loss factor) that must be provided at the natural frequency of lead-lag motion increases to a point where no presently available natural or synthetic elastomer can produce the required damping. Thus, in practice, damping for the Gorndt et al blade retention system must be provided by an auxiliary damper, rather than by the elastomeric laminations of the laminated bearing.

SUMMARY OF THE INVENTION

The present invention is directed to an articulated rotor blade retention system in which a pair of bearings that accommodate lead-lag motions of a rotor blade mounted by the system need only accommodate a relatively small portion of the flapping motions of the blade. Since they are not required to accommodate significant flapping motions, the bearings can be fabricated and located such that the retention system is relatively stiff in response to lead-lag motions of the rotor blade. The lead-lag stiffness of the system reduces the damping requirements of the system to a point where the required damping can be provided solely by damping material incorporated into the bearings.

According to the invention, the rotor blade retention system includes two bearings which are interconnected in parallel load transmitting relationship and which are disposed between the rotor blade and the rotor hub. Both bearings are connected in serial load transmitting relationship with a flap hinge. One bearing has an axis of greatest stiffness along the longitudinal axis of the rotor blade and has axes of lesser stiffnesses transverse to the longitudinal blade axis. The first bearing also defines an effective elastic center located on the longitudinal axis of the rotor blade. The other bearing has axes of greatest stiffness transverse the longitudinal blade axis and has an axis of lesser stiffness coincident with the axis of greatest stiffness of the first bearing. The second bearing defines an effective elastic center spaced along the longitudinal axis of the rotor blade from the elastic center of the first bearing. The two bearings accommodate lead-lag motions of the rotor blade. Because of the greater stiffness of the second bearing, as compared to the first bearing, in directions transverse to the longitudinal axis of the rotor blade, the axis about which lead-lag motion occurs is displaced from the effective elastic center of the first bearing. The displacement of the lead-lag axis causes the first bearing, and the retention system as a whole, to appear relatively stiff in response to lead-lag motions of the rotor blade. The stiffness of the retention system in response to flapping motions of the rotor blade is not affected, however, because the separate flap hinge is used to control the flapping stiffness of the retention system. In comparison to the corresponding stiffnesses of the bearings, the stiffness of the flap hinge in response to flapping motions of the rotor blade is such that the hinge accommodates a majority, if not substantially all, of the flapping motion, in preference to the bearings. Since the blade retention system is relatively stiff in response to lead-lag motions of the rotor blade, less damping is required at the natural frequencies of lead-lag motion to control resonant motions of the blade. The required damping can thus be provided by damping material incorporated into one or both of the bearings without the use of an auxiliary lead-lag damper. As a practical matter, the rotor blade retention system of the present invention is a soft in-plane system, with respect to lead-lag motions, rather than a stiff in-plane system or a fully articulated system.

In a preferred embodiment of the invention, each of the bearings is a laminated elastomeric bearing that includes a plurality of alternating and bonded together layers of elastomeric material and substantially inextensible material. Each layer of the first bearing has a spherical contour and is oriented generally normal to the longitudinal axis of the rotor blade. As a result, the first bearing is particularly effective in restraining the rotor blade against centrifugal forces imposed on the blade during rotation of the blade with the hub. The second bearing includes at least two contiguous layers that are annular and have mating spherical contours. At least a portion of the spherical contour of each of the two layers is oriented generally parallel to the longitudinal axis of the rotor blade. The annular shape and the orientation of the layers give the second bearing its required high stiffness in directions that are radial with respect to the longitudinal blade axis. The high radial stiffness tends to restrain translational movements of the rotor blade with respect to the hub in directions that are transverse to the longitudinal axis of the blade. As discussed above, the high radial stiffness also causes the lead-lag axis of rotation to be located relatively close to the second bearing.

Although the first bearing may be located closer to the rotor hub than the second bearing, the reverse arrangement of the bearings is preferred in order to place the axis of lead-lag motion as close as possible to the rotor hub. Positioning the lead-lag axis or hinge close to the rotational axis of the hub permits the most efficient utilization of the damping characteristics of the damping material that may be incorporated into the bearings. More particularly, the centrifugal force that is imposed on a rotor blade in motion also tends to act as a spring restraint on lead-lag motion of the blade. The lead-lag spring restraint afforded by the centrifugal force effectively acts at the axis of lead-lag motion. The spring rate or stiffness of the restraint increases with increasing distance along the rotor blade between the hub and the lead-lag axis. Since the centrifugal force spring restraint acts in parallel with the mechanical springs represented by the two bearings, the effective spring rate of the retention system is determined by the equation, $1/K_T = 1/K_1 + 1/K_2$. In the equation, $K_T$ is the spring rate of the retention system; $K_1$ is the spring rate of the centrifugal force spring restraint; and $K_2$ is the composite spring rate of the two bearings. Thus, as one component spring rate becomes larger than the other, it rapidly becomes the dominant factor in determining the effective spring rate of the retention system. At the same time, the damping characteristics of the spring elements are combined in the same ratio as the spring rates to determine the effective damping characteristic of the retention system. The spring restraint defined by the centrifugal force does not provide any significant amount of damping. Consequently, as the lead-lag spring rate of the centrifugal force spring restraint increases with respect to the lead-lag spring rate of the bearings, the damping that is effectively exercised on lead-lag motions of the rotor blade rapidly diminishes to negligible proportions no matter how much damping the bearings by themselves might provide. Locating the lead-lag axis relatively close to the rotor hub tends to diminish the contribution of centrifugal force to the lead-lag spring rate and damping characteristics of the retention system.

The concept, which is utilized in the present invention, of offsetting the axis of lead-lag motion from the effective elastic center of a bearing in a blade retention system so as to increase the stiffness of the retention system in response to lead-lag motions of a rotor blade has previously been proposed in Schmidt U.S. Pat. No. 3,292,712. In the Schmidt retention system, two laminated elastomeric bearings with spherically shaped laminations are mounted in parallel load transmitting relationship with the effective elastic centers of the two bearings offset from one another. The Schmidt patent states, at column 2, lines 32–42, that lead-lag motions of a rotor blade will produce some compression loading of the elastomeric layers in the two bearings and thereby increase the stiffnesses of the bearings in the lead-lag direction so as to approach a rigid (i.e., stiff in-plane) rotor. Although the Schmidt retention system may theoretically be able to provide a relatively high stiffness in response to lead-lag motions, the system suffers from the same practical disadvantages as the previously discussed rotor blade retention system of Gorndt et al U.S. Pat. No. 3,111,172. These disadvantages arise because the bearings of the Schmidt retention system experience both lead-lag and flap motions and any effort to adjust the lead-lag spring rate of the system will also affect the flapping spring rate of the system. In addition, the Schmidt blade retention system does not provide sufficient restraint on lateral and vertical translational motions of the rotor blade. The lateral and vertical restraint is critical because the rotor blade, when in motion, tends to move bodily in radial directions relative to its center line. The translational movements of the rotor blade can produce undesirable and service-life-reducing contacts between the relatively inflexible elements of the rotor hub and rotor blade which are intended to be kept separate by the laminated bearings.

The blade retention system of the present invention also bears some similarity in construction to the blade retention system that is shown in FIGS. 5, 6, and 7 of Mouille et al U.S. Pat. No. 3,967,918. In the Mouille et al rotor blade retention system, a flap hinge or flexure strap is located between a laminated elastomeric bearing and a ball-and-socket type bearing. The construction of the Mouille et al system is such that both the lead-lag and flapping motions of the rotor blade are accommodated about an axis that passes through the effective elastic center of the laminated elastomeric bearing. As a result, the laminated bearing experiences all of the flapping motion of the blade and must be dimensioned accordingly. Lead-lag motions of the rotor blade are damped by the action of viscoelastic damping material located adjacent to the ball-and-socket bearing.

BRIEF DESCRIPTION OF THE DRAWINGS

For a better understanding of the invention, reference may be made to the following description of an exemplary embodiment, taken in conjunction with the figures of the accompanying drawing, in which.

DESCRIPTION OF AN EMBODIMENT

Figure 1:
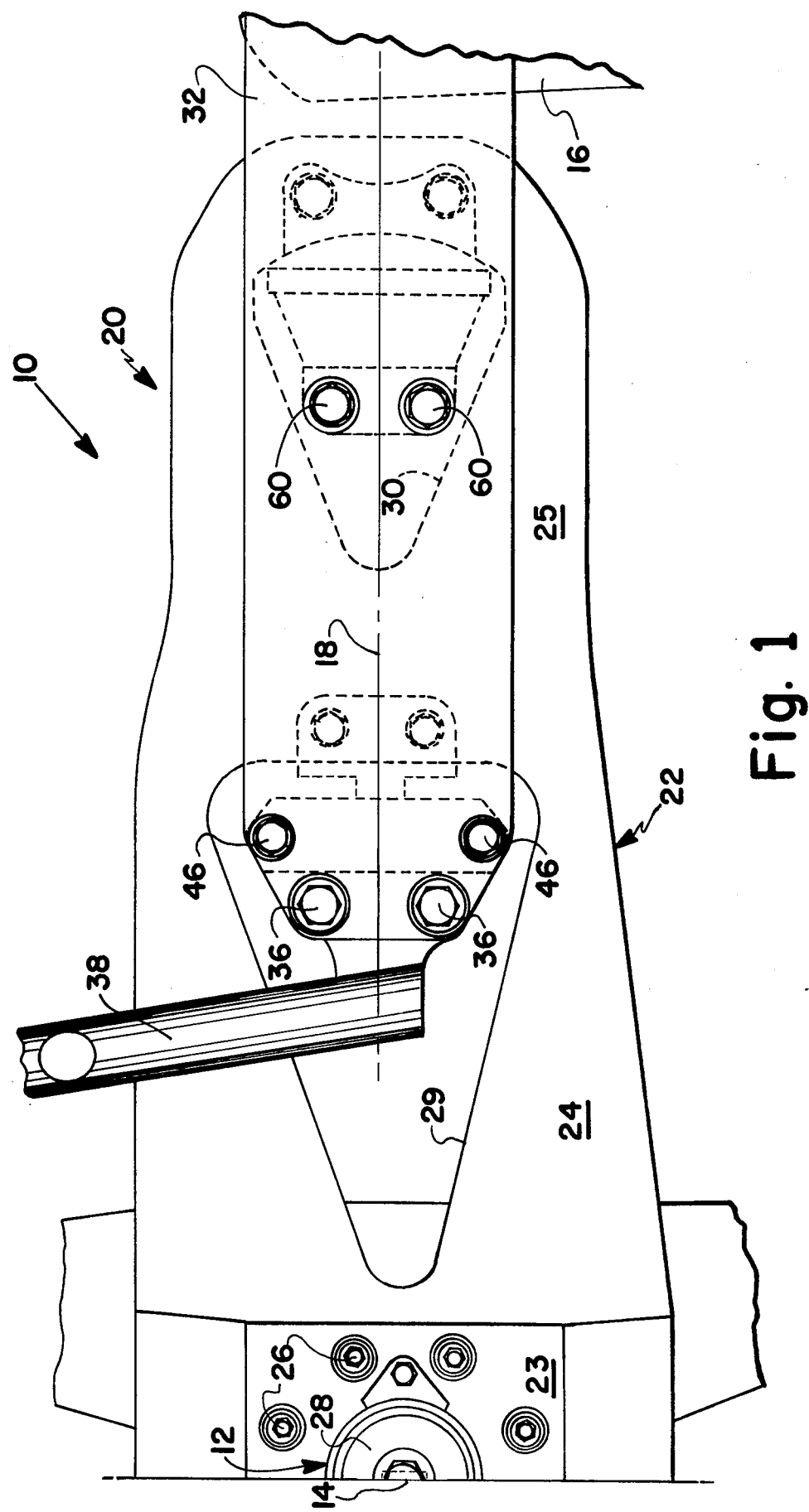
FIG. 1 is a top view of an articulated helicopter rotor incorporating a rotor blade retention system according to the present invention.

FIG. 1 of the drawings illustrates a portion of an articulated helicopter rotor 10 that includes a rotor hub 12 rotatably driven about its central axis 14 by a conventional drive assembly (not shown). Rotor blades 16 are coupled to the hub 12 for rotation with the hub about its central axis 14. Each blade 16 is normally disposed with a longitudinal axis 18 extending generally radially from the hub 12. Although only a single rotor blade 16 is shown in the drawings, the rotor hub 12 typically mounts four such rotor blades.

The illustrated rotor blade 16 is coupled to the hub 12 by a blade retention system, generally designated 20. The retention system 20 includes a flat, elongated arm 22, which is fabricated of metal or a composite material, such as high strength fibers imbedded in a resin matrix. The arm 22 is secured at its inboard end 23 to the rotor hub 12 and extends radially outwardly from the hub, generally in the plane of the blade 16. (Although the portion of the arm 22 which is designated by the reference numeral 23 is described herein as the "inboard" end or end section of the arm, the arm actually extends from the hub 12 in two opposed directions to couple two rotor blades 16 to the hub.) The inboard end section 23 of the arm 22 is relatively thick and inflexible. A large central opening is formed in the end section 23 of the arm 22, as are several smaller holes that are arranged in a circumferential array about the central opening. The central opening in the end section 23 of the arm 22 receives a shaft portion 27 of the rotor hub 12. The smaller holes in the inboard end section 23 of the arm 22 receive bolts 26 that secure the arm 22 to other, similar arms extending in transverse directions.

The arm 22 is held on the shaft portion 27 of the hub 12 by a cap element 28 screwed onto a threaded, free end of the shaft.

Immediately outboard of the rotor hub 12, the arm 22 has a section 24 of reduced thickness in a vertical plane. Because of its reduced thickness, the section 24 of the arm 22 is relatively flexible in a vertical plane and effectively forms a hinge. The hinge section 24 of the arm 22 extends to a point about midway along the length of the arm. Beyond the hinge section 24 of the arm 22, the outboard end section 25 of the arm 22 extends for the remainder of the length of the arm. The outboard end section 25 of the arm 22 is about the same thickness as the inboard end section 23 and is significantly thicker and less flexible than the hinge section 24. For practical purposes, the outboard end section 25 of the arm 22 may be regarded as substantially inflexible.

The arm 22 terminates just inboard, but spaced from the inboard end of the rotor blade 16. Along the length of the arm 22, there are formed two relatively large openings 29 and 30. Each of the openings 29 and 30 is roughly triangular in shape and has an apex directed generally toward the central axis 14 of the rotor hub 12. The opening 29 is located substantially in the hinge section 24 of the arm 22, while the opening 30 is located in the outboard end section 25 of the arm.

Lying above and below the outboard end section 25 of the arm 22, and forming a yoke about the arm 22 are a pair of substantially inflexible, flat arms 32 and 34. The yoke arms 32 and 34 are disposed in planes parallel to the plane of the arm 22 and are spaced in a vertical plane from the arm 22. At its outboard end, each of the yoke arms 32 and 34 is rigidly secured to the inboard end of the rotor blade 16 by connectors such as bolts and nuts (not shown). The bolts securing the arms 32 and 34 to the rotor blade 16 are inserted into aligned openings (not shown) formed in both arms and in the inboard end of the rotor blade. The outboard ends of the yoke arms 32 and 34 are thereby rigidly interconnected. The inboard ends of the arms 32 and 34 are also rigidly interconnected. A pair of bolts 36 are received in aligned openings formed in the yoke arms 32 and 34 and in one end of a pitch link 38. The yoke arms 32 and 34 are longitudinally disposed relative to the arm 22 such that the bolts 36 and the one end of the pitch link 38 extend through the outboard end of the opening 29 in the arm 22. Nuts 37 are screwed onto the ends of the bolts 36.

Disposed between the two yoke arms 32 and 34 so as to be located in the openings 29 and 30, respectively, which are formed in the arm 22 are a pair of laminated elastomeric bearings 40 and 42. As will be described hereinafter, the bearings 40 and 42 are connected both to the yoke arms 32 and 34 and to the arm 22. Each of the bearings 40 and 42 is comprised of a plurality of alternating and bonded together layers or laminations of elastomeric material and substantially nonextensible material. The laminations of the bearing 40 are frustrospherically shaped annuli, while the laminations of the bearing 42 are solid spherical segments. The elastomeric laminations of the bearing 40 are preferably formed of natural rubber, while the elastomeric laminations of the bearing 42 are preferably formed of a more highly damped synthetic elastomer. All of the inextensible laminations of both bearings 40 and 42 are preferably formed of steel. Other elastomeric and nonextensible materials may be substituted for the rubber and steel where appropriate. Alternate nonextensible materials may include other metals, fiberglass, reinforced plastic, and other materials of a composite nature which incorporate high-strength reinforcing fibers. Synthetic elastomers may be substituted for the natural rubber in the bearing 40. The elastomer used in the bearing 42 should preferably always be highly damped. For a detailed discussion of highly damped materials and their mode of operation, reference may be made to an article by Eric E. Ungar and D. Kent Hatch, entitled "High Damping Materials", which appeared in the periodical "Product Engineering", Volume 32, Number 16, dated Apr. 17, 1961.

Surrounding the annular laminations of the elastomeric bearing 40 is a relatively massive and substantially inflexible annular outer member 44 that is bonded to an adjacent elastomeric lamination. The outer member 44 is formed of steel, for example. Two parallel holes (not shown) are formed in the outer member 44, one on either side of the laminations of the bearing 40. The holes in the outer member 44 are aligned with corresponding holes formed in the inboard ends of the yoke arms 32 and 34. These aligned holes, which are located immediately outboard of the holes that receive the bolts 36, receive bolts 46. The bolts 46, with their corresponding nuts 47, rigidly interconnect the two yoke arms 32 and 34 and the outer member 44 of the laminated bearing 40. Within the annular laminations of the bearing 40 is a substantially inflexible ball member 48 that is also formed of steel, for example. The ball member 48 is bonded to an adjacent elastomeric lamination and is integrally connected at one end to a bifurcated bracket 50. Both the ball member 48 and the bracket 50 are coaxial with the longitudinal axis 18 of the rotor blade 16. Each branch or bifurcation of the bracket 50 has formed in it a pair of laterally spaced apart less that are vertically aligned with the holes in the other bifurcation. The aligned pairs of holes in the bracket 50 are also aligned with a corresponding pair of openings formed in the outer board end section 25 of the arm 22 adjacent the outboard end of the opening 29. The bracket 50, which receives the arm 22 between its bifurcations, is rigidly connected to the arm 22 by a pair of bolts 52. Each bolt 52 extends through a hole in each of the bifurcations of the bracket 50 and through the aligned opening in the arm 22. A nut 54 is screwed onto the exposed threaded end of each bolt 52. As can be seen from the foregoing description, the yoke arms 32 and 34 are interconnected with the arm 22 through the laminated elastomeric bearing 40.

At each end of the laminated elastomeric bearing 42, a relatively massive and inflexible end plate is bonded to an adjacent elastomeric lamination. The inboard end plate 56 has a convex, spherically shaped surface that is presented to the laminations of the bearing 42. Opposite the spherical surface, the end plate 56 is formed with a tongue 58. The tongue 58 extends along the longitudinal axis 18 of the rotor blade 16 and has a pair of laterally spaced apart openings formed in it. The openings in the tongue portion 58 of the end plate 56 are aligned with corresponding pairs of holes or openings formed in the yoke arms 32 and 34. Each of a pair of bolts 60 extends through aligned openings in the upper and lower yoke arms 32 and 34 and in the tongue portion 58 of the end plate 56. Nuts 62 are screwed onto the free threaded ends of the bolt 60 to secure the bolts in place. To maintain the spacing between the yoke arms 32 and 34 and the tongue portion 58 of the bearing end plate 56, sleeves 64 are disposed aroung the bolts 60 above and below the tongue 58 between the tongue 58 and the yoke arms 32 and 34. The end plate 56 is thus rigidly connected to the arms 32 and 34.

The other end plate 66 of the bearing 42 has a concave spherically shaped surface that is presented to the laminations of the bearing and to the end plate 56. Opposite its concave surface, the end plate 66 forms a bifurcated bracket 68. The bifurcations of the bracket 68 lie above the below the outboard end section 25 of the arm 22 adjacent the outboard edge of the opening 30. Each bifurcation of the bracket 68 has formed in it a pair of laterally spaced apart openings. Each of a pair of bolts 70 extends through an opening in each of the bifurcations of the bracket 68 and through the aligned opening formed in the arm 22. Nuts 72 are screwed onto the threaded ends of the bolts 70 to hold the bolts 70 in place.

As with the bearing 40, the arm 22 is interconnected to the yoke arms 32 and 34 through the bearing 42. In addition, as will be apparent from the foregoing description, the inner ball member 48 of the bearing 40 is rigidly interconnected to the end plate 66 of the bearing 42 by the outboard end section 25 of the arm 22. Similarly, the outer member 44 of the bearing 40 is rigidly interconnected, by the yoke arms 32 and 34 to the end plate 56 of the bearing 42. The bearings 40 and 42 may thus be regarded as being interconnected in parallel load transmitting relationship. Both bearings 40 and 42 are jointly connected in serial load transmitting relationship with the hinge section 24 of the arm 22.

In operation, when the rotor hub 12 is being rotated by its drive assembly (not shown), a centrifugal load is exerted on the rotor blade 16 along its longitudinal axis 18 and tends to force the blade 16 radially away from the hub. The centrifugal load is transferred from the blade 16, through the yoke arms 32 and 34, to the laminated elastomeric bearings 40 and 42. Since the two laminated elastomeric bearings 40 and 42 are connected together in parallel load transmitting relationship, the centrifugal load is transmitted from the bearings to the arm 22 through compression loading of the various elastomeric and inextensible layers of both bearings. The arm 22 transfers the load to the rotor hub 12.

Figure 2:
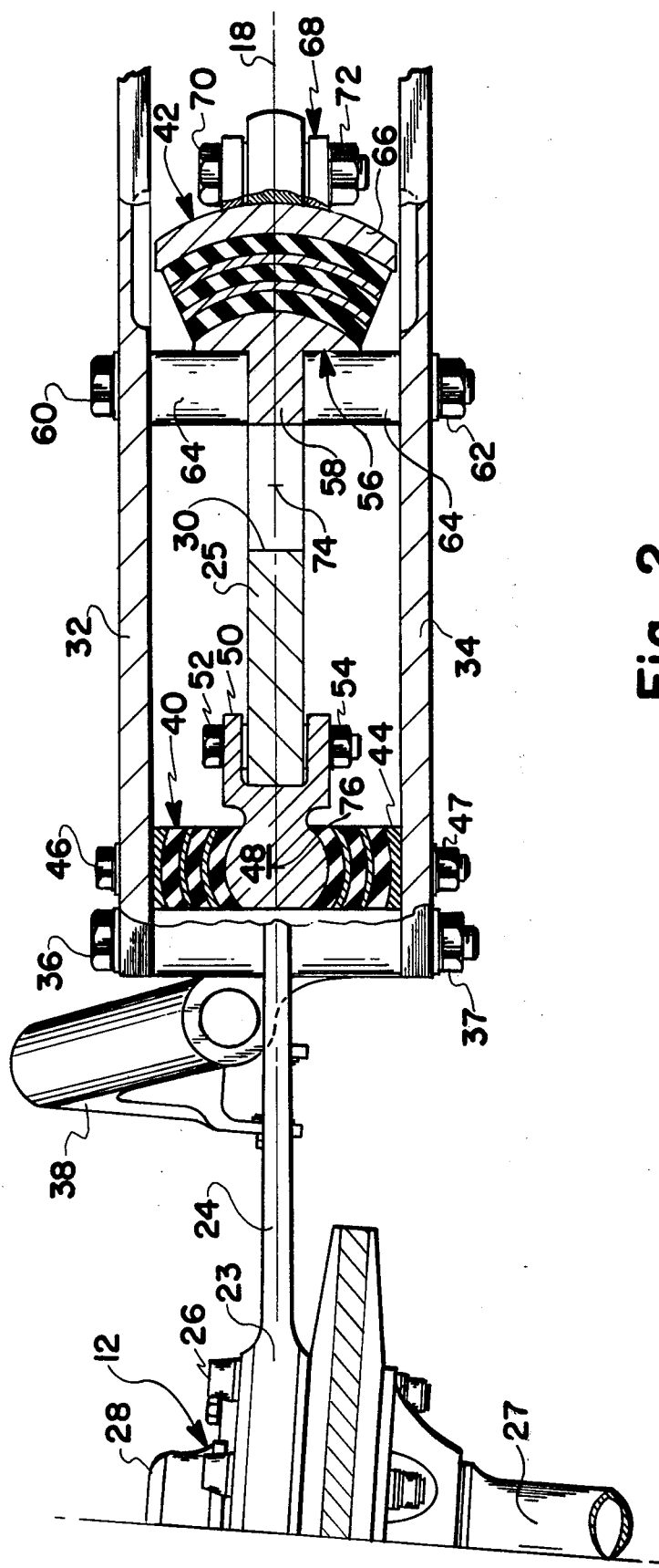
FIG. 2 is a side view, partly in section, of the rotor blade retention system of FIG. 1.

As can be seen from the drawings, particularly FIG. 2, the laminations of the bearing 42 are oriented generally normal to the axis 18 along which the centrifugal load is exerted. The bearing 42 is, therefore, loaded primarily in compression by any load applied along the longitudinal axis 18 of the rotor blade 16 and is relatively stiff (i.e., has a high spring rate) in the direction of the longitudinal blade axis. The laminations of the bearing 40, on the other hand, are oriented generally parallel to the axis 18 along which the centrifugal load is applied. The elastomeric laminations of the bearing 40 will therefore tend to be sheared, as well as compressed to some extent, by any load applied along the axis 18. Because of the relatively low shear stiffness of any elastomer, the bearing 40 will be less stiff than the bearing 42 in the direction of the blade axis 18. Due to the relative stiffnesses of the bearings 40 and 42 along the axis 18 (i.e., axial stiffnesses), the bearing 42 experiences a relatively large proportion of the centrifugal load exerted on the rotor blade 16. The bearing 40, which is loaded in a combination of compression and shearing of its elastomeric laminations, experiences a relatively small proportion of the centrifugal force. As an example of the relative axial stiffnesses of the two bearings 40 and 42, the spring rate or stiffness of the bearing 42 in the direction of the centrifugal load may be about 200 times the corresponding spring rate for the bearing 40.

While the laminated elastomeric bearings 40 and 42 are experiencing the centifugal load on the rotor blade 16, they also permit the blade some freedom to move in response to aerodynamic forces, for example, exerted in directions other than along the length of the blade. Such forces will produce, for example, lead-lag and flapping motions of the rotor blade 16, which are pivotal movements of the blade about axes transverse or, more specifically, generally perpendicular to the longitudinal axis 18 of the blade. The laminated elastomeric bearing 42 is capable of accommodating such motions through relative movement of the nonextensible laminations in the bearing and shearing of the elastomeric layers in the bearing. Normally, the relative movement of the nonextensible laminations in the bearing 42 would occur about the effective elastic center 74 of the bearing 42. The effective elastic center 74 is located inboard of the end plate 56 of the bearing 42 along the longitudinal axis 18 of the rotor blade 16. The laminated bearing 40 is also capable of accommodating lead-lag and flapping motions of the rotor blade through shearing of the elastomeric layers in the bearing. Again, the shearing of the elastomeric laminations and the relative rotational movements of the nonextensible laminations in the bearing 40 would normally occur about the effective elastic center 76 of the bearing. The effective elastic center is also the geometric center of the bearing 40 and of the ball member 48.

Because the effective elastic center 74 of the bearing 42 is offset several inches from the effective elastic center 76 of the bearing 40, the two bearings interact, in proportion to their relative stiffnesses in directions transverse to the axis 18, to produce a composite effective elastic center located between the elastic centers 74 and 76. The orientation of the laminations of the bearing 40 dictates that the bearing will have a relatively large stiffness, hereinafter designated radial stiffness, in directions transverse to the blade axis 18. The radial stiffness of the bearing 40 will be particularly large in comparison to its axial stiffness. The orientation of the laminations of the bearing 42, on the other hand, dictates that the bearing 42 will have a relatively small radial stiffness, both in comparison to its axial stiffness and in comparison to the radial stiffness of the bearing 40. Thus, for example, the radial stiffness or spring rate of the bearing 40 may be about twenty times that of the bearing 42. Because of the differences in the radial stiffnesses of the bearings 40 and 42, the composite effective elastic center of the two bearings will be located relatively near the effective elastic center 76 of the bearing 40.

Passing through the composite effective elastic center of the two bearings 40 and 42 is the lead-lag axis about which lead-lag motions of the rotor blade 16 will take place. By positioning lead-lag axis of the rotor blade 16 a significant distance from the effective elastic center 74 of the bearing 42, lead-lag motions of the rotor blade 16 will load the elastomeric laminations of the bearing 42 in a combination of compression and shear. Such combined compression and shear loading will provide a higher degree of restraint (i.e., a higher spring rate) with respect to lead-lag motions of the blade, than merely loading the elastomeric laminations in shear alone. As previously explained, by locating the effective lead-lag axis as close as possible to the central axis 14 of the rotor hub 12, the radial spring effect of the centrifugal force exerted on the rotor blade 16 will be held to a value that is not excessive in comparison to the lead-lag stiffness of the rotor blade retention system 20. Because the bearings 40 and 42, with the combined compression and shear loading of the bearing 42, impart a relatively high stiffness or spring rate to the whole retention system 20 in response to lead-lag motions of the rotor blade 16, the amount of damping required to control the movements of the rotor blade at the lead-lag natural frequency is reduced. By locating the lead-lag axis so as to minimize the radial spring effects of the centrifugal loads on the rotor blade 16, the damping provided by the highly damped elastomeric laminations of the bearing 42 can be most effectively utilized. The result is a retention system that can provide adequate lead-lag damping without an auxiliary lead-lag damper.

Although the bearings 40 and 42 are capable of accommodating flapping motions of the rotor blade 16 about an axis transverse to the longitudinal axis 18 of the blade and generally perpendicular to the central axis 14 of the rotor hub, the hinge section 24 of the arm 22 has a stiffness in response to flapping motions of the rotor blade 16 such that a majority of the flapping motion is accommodated through deflection of the hinge section of the arm 22. Preferably, the hinge section 24 of the arm 22 will experience substantially all of the flapping motion of the rotor blade 16 (i.e., about 95% to 99% of the flapping motion) about a flap axis near the center of the hinge section. By having the hinge section 24 of the arm 22 accommodate the majority of the flapping motion of the rotor blade 16, the motion does not have to be accommodated by the bearings 40 and 42, which have high radial spring rates or stiffnesses. Because the amplitude of flapping motions is typically several times (e.g., 7 to 8 times) the amplitude of corresponding lead-lag motions of a rotor blade 16, the bearings 40 and 42 would have to be increased in size (i.e., total thicknesses of elastomer) if they were to experience any significant portion of such motion. In addition, the application of high spring rates to flapping motions is generally undesirable.

Both the bearing 40 and the bearing 42 experience all of the pitch change motions of the rotor blade 16. The pitch change motions, which are controlled by the position of the pitch link 38, are rotational movements of the blade 16 about its longitudinal axis 18. Because the effective lead-lag axis and the flap axis are both relatively close together, the pitch link 38 can be located very near to both axes and thereby eliminate any undesirable change in the pitch angle of the blade 16 due to lead-lag and/or flapping motions of the blade.

Although the present invention has been described with reference to an embodiment that utilizes two bearings having spherically shaped elastomeric and nonextensible laminations, bearings that incorporate laminations of other shapes may be substituted for the bearings 40 and 42, provided the functioning of the two bearings is not altered. Thus, for example, while the bearing 40 has all of its laminations of an annular frustrospherical shape, it would be possible to substitute for the bearing 40 a bearing in which the innermost laminations are tubular in shape and only the outermost laminations are frustrospherical in shape. The tubular laminations would further reduce the axial spring rate of the bearing while the frustrospherical laminations would permit the bearing to deflect in response to lead-lag motions. Similarly, bearing 42 might have substituted for it a bearing in which the laminations are frustroconical in shape, for example, rather than being spherical segments. The frustroconical shape of such laminations would, of itself, produce some combined compression and shear loading of the elastomeric laminations in the bearing, even without an offset of the effective lead-lag axis from the effective elastic center of the bearing 42.

The illustrated embodiment of the invention shows a single arm 22 extending from the rotor hub 12 and being joined through the bearings 40 and 42 to a pair of yoke arms 32 and 34 secured to the rotor blade 16. Nonetheless, it would be possible to reverse this arrangement so that a rotor blade shaft is engaged between two yoke arms extending from the rotor hub 12. It would also be possible to have the rotor blade shaft in such an alternate arrangement extend through the centers of both bearings, rather than around the bearing 42 as in the illustrated embodiment of the invention. Finally, it would be possible to reverse the positions of the bearings 40 and 42. Such a reverse arrangement would, however, forfeit some of the advantage of having the lead-lag axis as close to the central axis 14 of the rotor hub 12 as it is in the illustrated embodiment of the invention.

It will be understood that the embodiment described above is merely exemplary and that persons skilled in the art may make many variations and modifications without departing from the spirit and scope of the invention. All such modifications and variations are intended to be within the scope of the invention as defined in the appended claims.

What is claimed is:

1. A rotor blade retention system for connecting at least one elongated rotor blade to a rotor hub that is rotatable about a central axis, the connected rotor blade normally extending generally radially from the hub and being rotatable with the hub about its central axis, said retention system comprising:
   (a) first bearing means disposed between the rotor blade and the rotor hub, the first bearing means having an axis of greatest stiffness along a longitudinal axis of the rotor blade and having axes of lesser stiffnesses transverse to the longitudinal axis of the rotor blade, the first bearing means defining a first effective elastic center on the longitudinal axis of the rotor blade and restraining the rotor blade against centrifugal forces imposed on the blade during rotation of the blade with the rotor hub;
   (b) second bearing means disposed beteen the rotor blade and the rotor hub and connected with the first bearing means in parallel load transmitting relationship at least with respect to said centrifugal forces imposed on the rotor blade, the second bearing means having axes of greatest stiffness transverse to the longitudinal axis of the rotor blade and an axis of lesser stiffness coincident with the axis of greatest stiffness of the first bearing means and the longitudinal axis of the rotor blade, the second bearing means defining a second effective elastic center which is located on the longitudinal axis of the rotor blade and which at all times is spaced from the first effective elastic center of the first bearing means;
   (c) hinge means for permitting and deflecting in response to flapping motions of the rotor blade about a flapping axis which is oriented transverse to the longitudinal axis of the rotor blade and more nearly perpendicular than parallel to the central axis of the rotor hub, the hinge means being disposed between the rotor hub and the first and second bearing means and being connected to the rotor hub and to the first and second bearing means;

(d) first substantially inflexible means for rigidly interconnecting the first and second bearing means and for rigidly connecting said first and second bearing means to the rotor blade; and (e) second substantially inflexible means for rigidly interconnecting the first and second bearing means, the first and second interconnecting means cooperating to mount the bearing means in parallel load transmitting relationship, the second interconnecting means also connecting said first and second bearing means to the hinge means in serial load transmitting relationship so that the hinge means acts in series with the first bearing means to restrain the rotor blade against centrifugal forces imposed on the blade, the stiffness of the hinge means in response to flapping motions of the rotor blade about said flapping axis being in comparison to corresponding stiffnesses of the first and second bearing means such that the hinge means accommodates a majority of the flapping motion of the rotor blade, the relative stiffnesses of the first and second bearing means in directions transverse to the longitudinal axis of the rotor blade being such that a lead-lag axis which is oriented transverse to the longitudinal axis of the rotor blade and more nearly parallel than perpendicular to the central axis of the rotor hub and about which oscillatory lead-lag motions of the rotor blade occur is located closer to the second elastic center than to the first elastic center within an area longitudinally bounded by and including the first and second elastic centers, the blade retention system being constructed so as to cause the natural frequency of oscillation of the rotor blade about the lead-lag axis to be less than the normal operating speed of rotation of the rotor blade and hub.

2. A rotor blade retention system, according to claim 1, wherein the bearing means are fabricated and located so as to provide adequate damping for lead-lag motions of the rotor blade at the natural frequency of oscillation of the rotor blade about the lead-lag axis without additional damping structure, and wherein the rotor blade retention system is free of any such additional damping structure.

3. A rotor blade retention system, according to claim 1, wherein the stiffness of the hinge means in response to flapping motions of the rotor blade is such that the hinge means accommodates substantially all of said flapping motion.

4. A rotor blade retention system, according to claim 1, wherein the first bearing means is a laminated elastomeric bearing which includes a plurality of alternating and bonded together layers of elastomeric material and substantially inextensible material.

5. A rotor blade retention system, according to claim 4, wherein each layer of the elastomeric bearing of the first bearing means has a spherical contour and is oriented generally normal to the longitudinal axis of the rotor blade.

6. A rotor blade retention system, according to claim 1, wherein the second bearing means is a laminated elastomeric bearing which includes a plurality of alternating and bonded together layers of elastomeric material and substantially inextensible material.

7. A rotor blade retention system, according to claim 6, wherein at least two contiguous layers of the elastomeric bearing of the second bearing means are annular and have mating spherical contours and at least a portion of the spherical contour of each of said at least two layers is oriented generally parallel to the longitudinal axis of the rotor blade.

8. A rotor blade retention system, according to claim 6, wherein the first bearing means is a laminated elastomeric bearing which includes a plurality of alternating and bonded together layers of elastomeric material and substantially inextensible material.

9. A rotor blade retention system for connecting at least one elongated rotor blade to a rotor hub that is rotatable about a central axis, the connected rotor blade normally extending generally radially from the hub and being rotatable with the hub about its central axis, said retention system comprising:

(a) a first laminated elastomeric bearing which includes a plurality of alternating and bonded together layers of elastomeric material and substantially inextensible material, the first bearing being disposed between the rotor blade and the rotor hub and having an axis of greatest stiffness along a longitudinal axis of the rotor blade and axes of lesser stiffnesses transverse to the longitudinal axis of the rotor blade, the first bearing defining a first effective elastic center on the longitudinal axis of the rotor blade and restraining the rotor blade against centrifugal forces imposed on the blade during rotation of the blade with the rotor hub;

(b) a second laminated elastomeric bearing which includes a plurality of alternating and bonded together layers of elastomeric material and substantially inextensible material, the second bearing being disposed between the first bearing and the rotor hub and connected with the first bearing in parallel load transmitting relationship at least with respect to said centrifugal forces imposed on the rotor blade, the second bearing also having axes of greatest stiffness transverse to the longitudinal axis of the rotor blade and an axis of lesser stiffness coincident with the axis of greatest stiffness of the first bearing and the longitudinal axis of the rotor blade, the second bearing defining a second effective elastic center which is located on the longitudinal axis of the rotor blade and which at all times is spaced from the first effective elastic center of the first bearing;

(c) hinge means for permitting and deflecting in response to flapping motions of the rotor blade about a flapping axis which is oriented transverse to the longitudinal axis of the rotor blade and more nearly perpendicular than parallel to the central axis of the rotor hub, the hinge means being disposed between the rotor hub and the first and second bearings and being connected to the rotor hub and to the first and second bearings;

(d) first substantially inflexible means for rigidly interconnecting the first and second bearings and for rigidly connecting said first and second bearings to the rotor blade; and (e) second substantially inflexible means for rigidly interconnecting the first and second bearings, the first and second inflexible interconnecting means cooperating to mount the bearings in parallel load transmitting relationship, the second inflexible interconnecting means also connecting said first and second bearings to the hinge means in serial load transmitting relationship so that the hinge means acts in series with the first bearing to restrain the rotor blade against centrifugal forces imposed on the blade, the stiffness of the hinge means in response to flapping motions of the rotor blade about said flapping axis being in comparison to corresponding stiffnesses of the first and second bearings such that the hinge means accommodates a majority of the flapping motion of the rotor blade, the relative stiffnesses of the first and second bearings in directions transverse to the longitudinal axis of the rotor blade being such that a lead-lag axis which is oriented transverse to the longitudinal axis of the rotor blade and more nearly parallel than perpendicular to the central axis of the rotor hub and about which oscillatory lead-lag motions of the rotor blade occur is located closer to the second elastic center than to the first elastic center within an area longitudinally bounded by and including the first and second elastic centers, the elastomeric layers of the first bearing being fabricated of an elastomeric material that is highly damped in comparison to natural rubber so that lead-lag motions of the rotor blade at the natural frequency of oscillation of the rotor blade about the lead-lag axis are damped primarily by the first bearing, the blade retention system being constructed so as to be free of lead-lag damping structure other than the first and second bearings and so as to cause the natural frequency of oscllation of the rotor blade about the lead-lag axis to be less than the normal operating speed of rotation of the rotor blade and hub.

10. A rotor blade retention system, according to claim 9, wherein each layer of the first bearing has a spherical contour and is oriented generally normal to the longitudinal axis of the rotor blade.

11. A rotor blade retention system, according to claim 9, wherein each layer of the second bearing is annular and at least two contiguous layers having mating spherical contours, at least a portion of the spherical contour of each of said at least two layers being oriented generally parallel to the longitudinal axis of the rotor blade.

* * * * *